United States Patent [19]

Close

[11] Patent Number: 4,565,996
[45] Date of Patent: Jan. 21, 1986

[54] RANGE LIMITED COHERENT FREQUENCY DOPPLER SURVEILLANCE SYSTEM

[75] Inventor: Leo R. Close, Sepulveda, Calif.

[73] Assignee: Mrs. Lawrence Israel, Van Nuys, Calif.

[21] Appl. No.: 577,348

[22] Filed: Feb. 6, 1984

[51] Int. Cl.$^4$ ............................................ G08B 13/14
[52] U.S. Cl. ................................. 340/572; 340/554; 343/6.5 R
[58] Field of Search ............... 340/571, 572, 568, 522, 340/554; 343/5 PD, 6.5 R

[56] References Cited

U.S. PATENT DOCUMENTS

| | | | |
|---|---|---|---|
| 3,493,955 | 2/1970 | Minasy | 340/572 |
| 3,810,172 | 5/1974 | Burpee et al. | 343/5 PD |
| 3,863,244 | 1/1975 | Lichtblau | 340/572 |
| 3,975,729 | 8/1976 | Ringer | 343/5 PD |
| 4,117,466 | 9/1978 | Lichtblau | 340/501 |
| 4,206,453 | 6/1980 | Williamson | 340/572 |
| 4,212,002 | 7/1980 | Williamson | 340/572 |
| 4,274,089 | 6/1981 | Giles | 340/572 |
| 4,281,321 | 7/1981 | Narlow et al. | 340/572 |
| 4,302,846 | 11/1981 | Stephen et al. | 455/19 |
| 4,303,910 | 12/1981 | McCann | 340/572 |

OTHER PUBLICATIONS

Skolnick, *Introduction to Radar Systems*, McGraw-Hill Book Co., 2nd Ed. 1980, pp. 68–98 and 117–119.

*Primary Examiner*—James L. Rowland
*Assistant Examiner*—Jeffery A. Hofsass
*Attorney, Agent, or Firm*—Fraser and Bogucki

[57] ABSTRACT

A time limited coherent frequency doppler radar system monitors a precisely bounded merchandise detection zone for motion of a transducer therein. False alarms are reduced without limiting sensitivity by limiting the maximum radar signal propogation times to control the outer boundaries of the detection region and by requiring a selected minimum motion within the detection zone. An even more precisely bounded merchandise surveillance zone can be realized by using two spaced-apart radar systems having overlapping detection zones.

16 Claims, 13 Drawing Figures

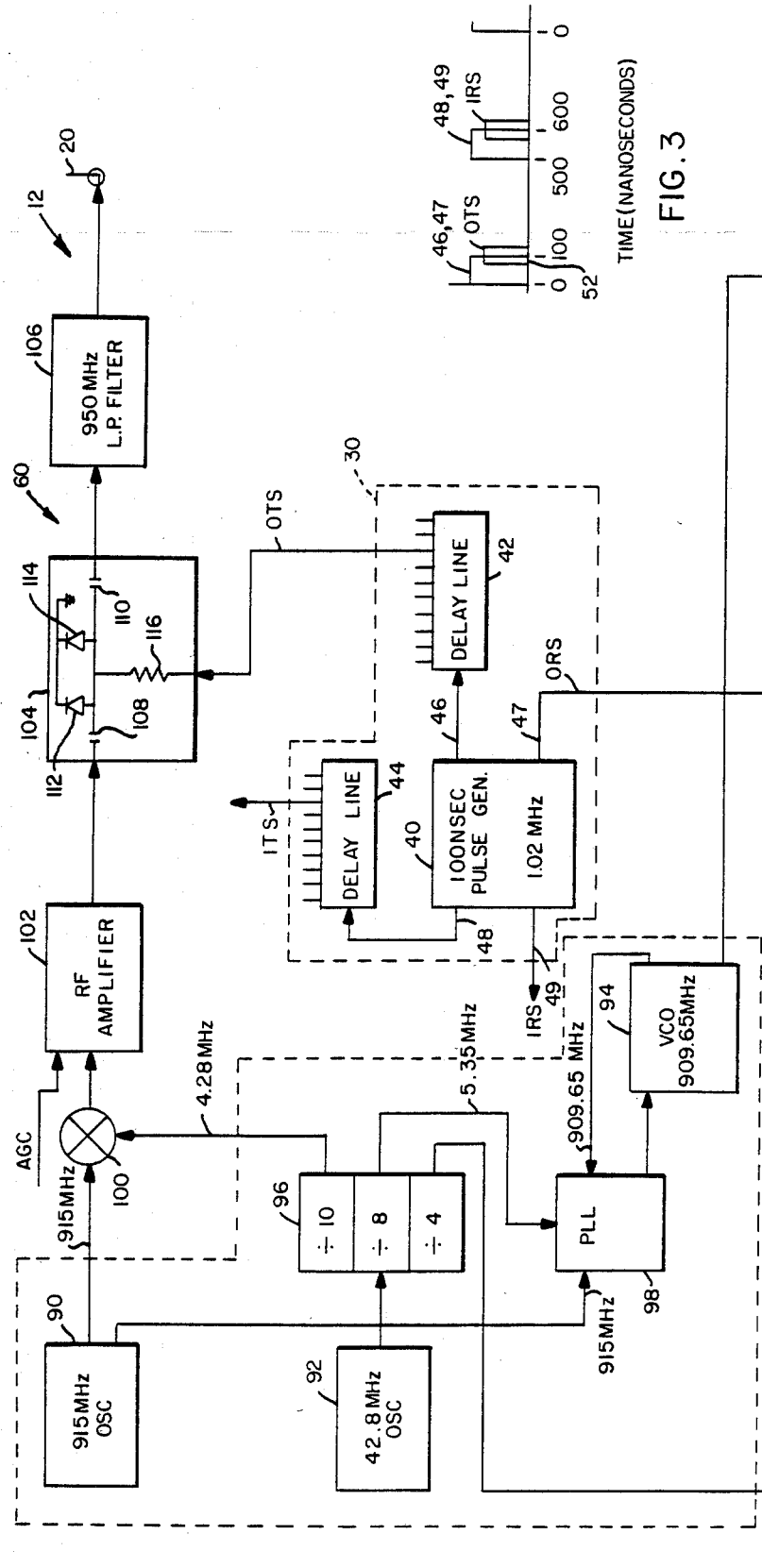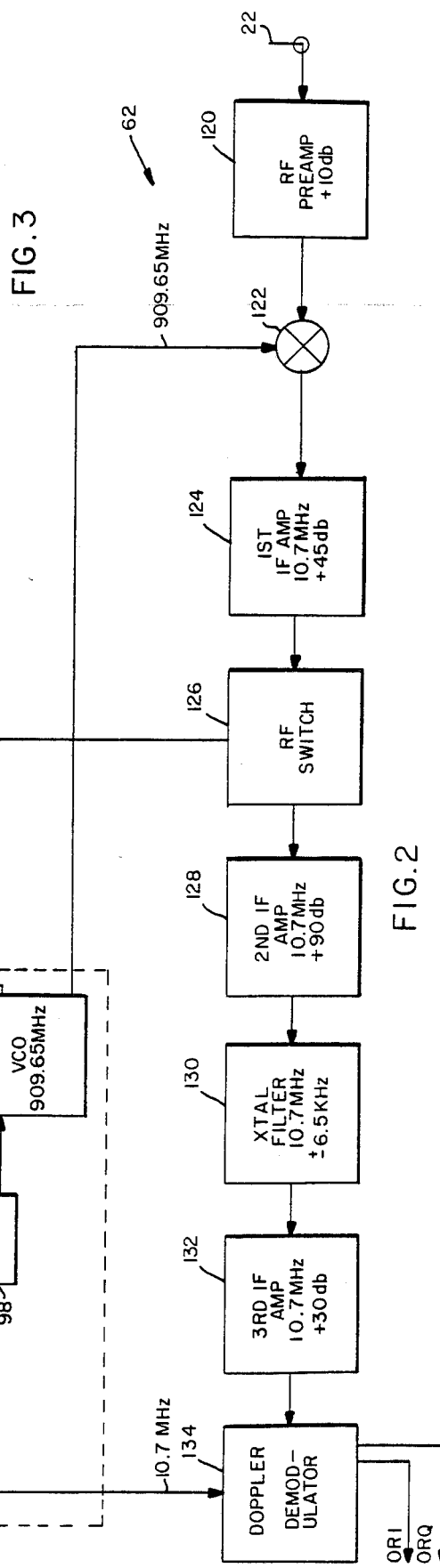

DOPPLER SIGNAL CIRCUIT 18

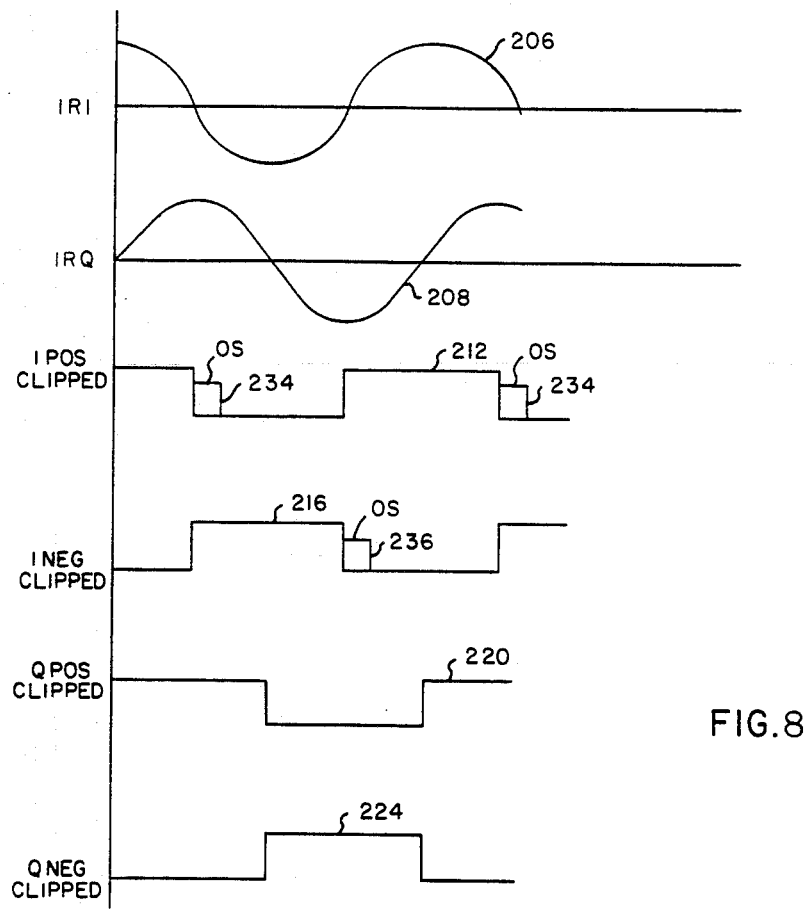
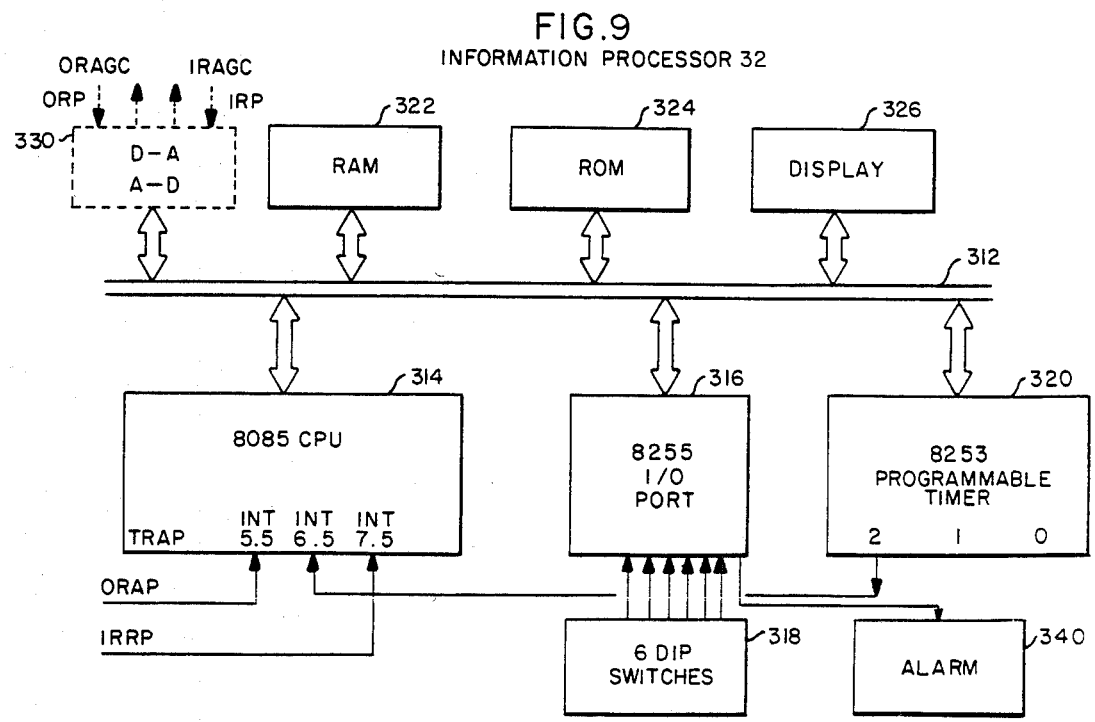

MAIN PROGRAM

RANGE LIMITED COHERENT FREQUENCY DOPPLER SURVEILLANCE SYSTEM

CROSS REFERENCE TO RELATED APPLICATIONS

This application is related to application Ser. No. 577,583, filed 2/6/84, for "ELECTRONIC SURVEILLANCE SYSTEM EMPLOYING THE DOPPLER EFFECT", by Leo R. Close, and application Ser. No. 501,881, filed June 7, 1983 for "PNEUMATICALLY RELEASABLE TAMPER-RESISTANT SECURITY TAG" by Leo R. Close.

BACKGROUND OF THE INVENTION

1. Field of the Invention

This invention relates to surveillance systems and more particularly to coherent frequency doppler effect radar systems for detecting minimum motion of a transponder within a detection zone limited in extent by radar signal propagation times.

2. Discussion of the Prior Art

Theft from business establishments has long been a serious and growing problem. This has been particularly true for retail establishments such as clothing stores where the trend has been to make merchandise readily accessible and to encourage self-service by the customers. While encouraging purchases and reducing labor costs, such merchandising techniques have had the undesirable effect of reducing the barriers to theft.

A known technique for discouraging theft of merchandise is to place on each merchandise item a transponder tag which receives and reradiates radio frequency electromagnetic signals. Detector systems are placed at each exit to sound an alarm whenever an active transponder tag approaches the exit. An alarm thus sounds whenever an attempt is made to carry stolen merchandise through an exit. The alarm does not sound for lawful customers because when a customer pays for selected merchandise the sales clerk uses a special tool or key to either render the transponder inactive or to remove the transponder for reuse on another item of merchandise.

The transponder can be as simple as a flat metal strip in the shape of an open loop bridged by a nonlinear circuit device such as a diode. The nonlinear circuit device causes the transponder to modulate incident waves and reradiate the sums and harmonics of the incident waves. Such a device can be enclosed within a plastic housing which is affixed to merchandise items and removed only with a special tool.

Such surveillance systems have proven highly effective in reducing theft. Experience has shown, however, that the deterrent effect of such systems derives more from the knowledge among shoppers that such a system is in place than from the ability of such a system to reliably detect theft. In fact, many of the systems presently in use are more likely to indicate a false alarm than the presence of a pilferer and store personnel often reduce the sensitivity of the system in an attempt to eliminate the false alarms. The result is that the system often fails to respond to the presence of a transponder tag when it should.

Moreover, because most surveillance systems operate on a proximity principle which causes a detector to indicate an alarm when a transponder comes close enough to reradiate a signal having a strength greater than a threshold value, care must be taken to keep merchandise a considerable distance from the store exits. Not only does this waste valuable floor space near the store exits, but an alarm will be sounded any time a customer carries a tagged item near a store exit even if there is no attempt to steal the item. Such false alarms become an embarrassment to both customers and the store proprietor and can rapidly destroy customer goodwill.

Many examples of surveillance systems can be found in the prior art. Thus, U.S. Pat. No. 4,281,321 (Narlow et al) discloses a surveillance system in which the sum of a high frequency carrier signal and a lower frequency modulating signal produced by a floor mat is detected.

U.S. Pat. No. 4,274,089 (Giles) discloses a surveillance system in which harmonics of one signal are detected instead of the sum of two signals.

U.S. Pat. No. 4,303,910 (McCann) teaches an arrangement in which a transponder tag can be excited by an incident signal at a first frequency to cause resonance and reradiation of a return signal at a second frequency. False alarms are reduced by requiring the transponder to respond simultaneously to two different incident signals radiated by different antennas on opposite sides of a surveillance zone.

U.S. Pat. No. 4,212,002 and U.S. Pat. No. 4,206,453, both to Williamson, disclose a surveillance system in which a large area is radiated with a signal of a first frequency and smaller control areas within the large area are radiated with signals of second and third frequencies which define boundaries of the smaller control zones. Detection of transponder signals reflecting all of the transmitted signals indicates the presence of the transponder within the control zone.

U.S. Pat. No. 4,117,466 (Lichtblau) teaches an arrangement in which false alarms are reduced by detecting noise interference from an interfering transmitter and inhibiting the generation of an alarm during the presence of such noise interference.

U.S. Pat. No. 3,863,244 (Lichtblau) discloses a surveillance system using an incident transmitter which sweeps through a range of frequencies and transponders which are excited by more than one frequency. An alarm is indicated only when a transponder is excited at each of its different frequencies.

U.S. Pat. No. 3,493,955 (Minasy) teaches another arrangement utilizing a transponder which resonates at a second frequency when excited by incident signals transmitted at a first frequency. A detector circuit responds to signals at the second frequency.

Skolnik, Merrill I., *Introduction to Radar Systems*, McGraw-Hill Book Company, 2nd Ed. 1980, discloses at pages 68–98 a doppler shift CW radar system using a quadrature phase doppler detector to detect both the magnitude and polarity of motion induced doppler frequency shifts in a received radar signal. This treatise also describes, at pages 117–119, a range-gating technique used in connection with doppler filters.

Last, U.S. Pat. No. 4,302,846 (Stephen et al) discloses a particular transponder arrangement including a nonlinear coupling element.

SUMMARY OF THE INVENTION

A surveillance system in accordance with the invention may advantageously include a coherent frequency doppler radar system disposed to generate a doppler signal indicative of motion of a transducer within a detection zone limited in extent by a maximum transmitter-to-transducer-to-receiver radar signal propagation time and a processing system coupled to receive the doppler signal and indicate the presence of a transducer within the detection zone in response to an indication by the doppler signal of a selected minimum motion within the detection zone. A radar transmitter generates incident signals during short, periodic transmit time intervals. A radar receiver monitors a surveillance area during periodic receive time intervals for receipt of return signals generated by a transducer in response to the incident signals. The range is precisely limited by terminating the receive time intervals a predetermined time after initiation of the transmit time intervals.

Use of two spaced-apart radar systems permits a surveillance zone to be even more precisely defined in overlapping regions of the two detection zones between the two radar systems. Precise detection zone boundaries are defined providing a fast rise time transmitter, a fast fall time receiver, and precisely controlling the time therebetween. Motion is advantageously detected in a digital processing system by converting cycles of the doppler signals to digital pulses.

BRIEF DESCRIPTION OF THE DRAWINGS

A better understanding of the invention may be had from a consideration of the following Detailed Description taken in conjunction with the accompanying drawings in which:

FIG. 2 is a block diagram of a radar unit for the radar system shown in FIG. 1;

FIG. 3 is a representation of waveforms that are useful in understanding the radar system shown in FIG. 1;

FIG. 8 is a graphical representation of certain waveforms that are useful in understanding the operation of the doppler signal circuit shown in FIG. 7;

FIG. 9 is a block diagram representation of an information processor used in the radar system shown in FIG. 1.

DETAILED DESCRIPTION

Figure 1:
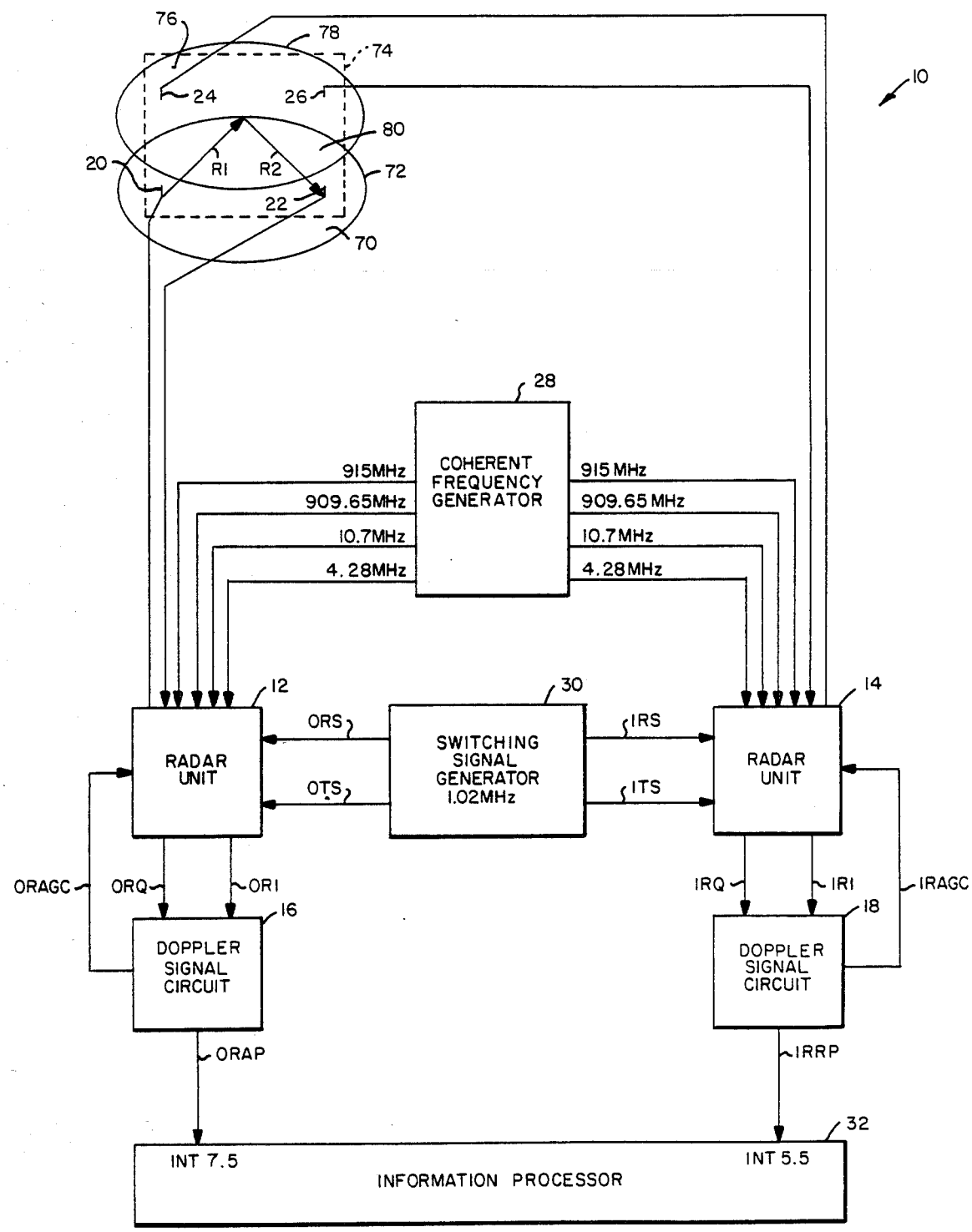
FIG. 1 is a block diagram and schematic representation of a range limited coherent frequency doppler radar surveillance system in accordance with the invention.

Referring now to FIG. 1, there is shown a coherent frequency doppler radar system 10 in accordance with the invention which includes a first or outside radar unit 12 and a second or inside radar unit 14. A doppler signal circuit 16 receives quadrature phased doppler frequency signals ORQ and ORI from radar unit 12 and responds by generating an outer receiver approaching pulse, ORAP for each half cycle of a motion induced doppler signal while the motion is in a direction approaching a pair of transmit, receive antennas 20, 22. Doppler signal circuit 16 generates an outer receiver automatic gain control signal, ORAGC, which is communicated back to a receiver portion of radar unit 12. A doppler signal circuit 18 similar to doppler signal circuit 16 receives quadrature phased doppler frequency inner receiver signals, IRQ and IRI, from radar unit 14 and responds by generating an inner receiver receding pulse signal, IRRP, providing a pulse for each half cycle of a doppler frequency signal generated by motion of a transducer while receding from transmit, receive antennas 24, 26. Doppler signal circuit 18 also generates an inner receiver automatic gain control signal, IRAGC, which is communicated to a receiver portion of radar unit 14. The two radar units 12, 14 are advantageously implemented as coherent frequency doppler radar units and operate in response to four coherent or phase locked signals generated by a coherent frequency generator 28.

A switching signal generator 30 alternately enables the radar unit 12 and the radar unit 14 with 100 nanosecond pulses in repetitive cycles at a frequency of 1.02 MHz. The frequency of 1.02 MHz is selected to avoid harmonic interference between the switching signal frequency and the 10.7 MHz intermediate frequency of the radar unit 12, 14. While each of the radar units 12, 14 is pulsed or in effect sampled at a rate of 1.02 MHz, the output doppler frequency signals have a frequency on the order of 30 Hz and low pass filtering results in continous outputs for signals ORI, ORQ, IRI and IRQ.

An information processor 32 receives the output receiver approaching pulse signals ORAP at an interrupt 7.5 and the inner receiver receding pulse signals, IRRP, at an interrupt 5.5. By in effect counting these pulse signals, information processor 32 can require detection of a moving transponder by both radar systems 12, 14 through a selected distance corresponding to a particular number of doppler signal cycles before sounding an alarm. In this way, substantial immunity to random noise signals is provided with an alarm being indicated only upon the receipt of a significant number of pulse signals from both radar unit 12 and radar unit 14.

Making further reference now to FIGS. 2 and 3, the switching signal generator 30 includes a 100 nanosecond pulse generator 40 an outer receiver delay line 42 and an inner receiver delay line 44. During each approximately 980 nanosecond period of the switching pulses pulse generator 40 generates a pair of outer switching pulses 46, 47 during the time interval 0 to 100 nanoseconds and a pair of inner switching pulses 48, 49 during the time interval 500 to 600 nanoseconds.

The two pairs of pulses 46, 47 and 48, 49 are thus generated in alternate time displaced multiplexed noninterferring fashion so that pulsed operation of the outer radar unit 12 is independent of and does not interfere with pulsed operation of the inner radar unit 14. The 100 nanosecond pulse 46 is a transmitter control pulse which is communicated to the delay line 42 which has a plurality of output taps, each generating a different, precisely controlled delay time. In the present example a tap providing an 80 nanosecond delay is selected to generate an outer transmitter switching signal, OTS, which enables a transmitter portion 60 of radar unit 12.

As illustrated in FIG. 3, the signal OTS is delayed relative to the 100 nanosecond pulses 46, 47 but has a 20 nanosecond window 52 during which signal OTS overlaps switching signal 47. Signal OTS is shown with a smaller magnitude only to permit the representation of pulse signal OTS to be visually distinguished from the representation of pulse signals 46, 47. The pulse signal 47 becomes the outer receiver switching pulse, ORS, and is communicated to enable a receiver portion 62 of outer radar unit 12. Alternately with the pulse signals 46, 47 the pulse signals 48, 49 are generated with signal 48 being communicated to the delay line 44 to generate an inner transmitter switching signal, ITS, for enabling the transmitter portion of inner radar unit 14.

It will be observed from FIG. 3 that a small overlap or window time 52 of approximately 20 nanoseconds exists between the rising edge of signal OTS and the trailing edge of pulse signal 47. This means that there is an approximately 20 nanosecond time interval between the time that the outer transmitter 60 is turned on and the time that outer receiver 62 is turned off. Since a propagating radar signal travels with a velocity of approximately 1 foot per nanosecond, the first cycle of the radar signal emitted from antenna 20 can travel approximately 20 feet as it leaves the antenna 20, is modulated by a transducer and returns to the antenna 22. This distance is represented by two vectors R1 and R2 in FIG. 1. If the sum of the distances represented by the two vectors R1, R2 is any greater than 20 feet, the receiver 62 will be turned off by switching pulse signal ORS before the first cycle of the transmitted radar signal returns to the receiver and the signal will not be detected. This range limitation in which the sum of the distances traveled by the propagating and returning radar signals must be less than a maximum in order to be detected, defines a detection region 70 bounded by an elliptically shaped boundary 72 having foci at the two antennas 20, 22.

Because the range of the radar unit 12 is limited by the time interval 52 between the rising transition of the transmitter signal OTS and the falling transition of the receiver switching signal, ORS, the boundary 72 is precisely defined and the position remains far more stable than in the typical case where the boundary is controlled by the magnitude of the signal radiated from transmitter antenna 20 and the sensitivity of the receiver 60. The radar unit 12 is thus particularly suitable for use in a retail clothing store wherein small, passive transponders may be fixed to clothing on display. For example, the antennas 20, 22 may be advantageously placed in a doorway of such a retail establishment with the doorway being represented in plan view by dashed rectangle 74 in FIG. 1. Because of the precise boundary limitations on the surveillance area 70, garments bearing transponder tags may be displayed relatively close to the antennas 20, 22 without producing a false alarm as they are examined by a customer. In contrast, sensitivity limited surveillance systems require a substantial guardband about the detecting antenna to prevent false alarms as the transponder is moved near a monitored area. The guardband is required because the boundaries of such a sensitivity limited monitored area may vary substantially with atmospheric conditions and time variant circuit parameters of the radar unit.

Even further protection against false alarms can be achieved by utilizing the inner radar unit 14 having a detection zone 76 bounded by an elliptical boundary 78. False alarm indications can be reduced by requiring that an alarm be sounded only when a transponder is within a surveillance zone 80 which is overlapped by both the detection zone 70 of outer radar unit 12 and the detection zone 76 of inner radar unit 14. Even greater assurance of a true alarm condition can be realized by requiring substantial motion of the transponder within the overlapping surveillance zone 80 in a direction away from or receding from the inner radar unit 14 and in a direction approaching the radar unit 12. Because both of the detection zones 70, 76 are precisely bounded by boundaries 72, 78 respectively, the surveillance zone 80 is also precisely bounded to enable the display of store merchandise within a few feet of the doorway 74.

The coherent frequency generator 28 includes a 915 MHz oscillator 90, a 42.8 MHz oscillator 92, and a 909.65 MHz voltage controlled oscillator 94. The frequency divider circuit 96 divides the 42.8 MHz signal from oscillator 92 by respectively 10, 8 and 4. A phase locked loop 98 modulates the 915 MHz signal with the 909.65 MHz output of voltage controlled oscillator 94 to produce a 5.35 MHz difference signal which is phase locked with the 5.35 MHz output of the divided by 8 portion of divider circuit 96. The 909.65 MHz output signal from VCO 94 is thus frequency coherent with or phase locked to the difference of the two signals generated by oscillators 90 and 92. The transmitter 60 includes a modulator 100 which modulates the 915 MHz carrier signal from oscillator 90 with a 4.28 MHz modulating signal from the divide by 10 portion of frequency divider 96. Modulator 100 suppresses the carrier while passing the upper and lower sidebands to an RF amplifier 102 which responds to an automatic gain control signal which may be adjusted to provide desired signal magnitude, but which remains substantially constant during normal operation.

The amplified upper and lower sideband signals at 915±4.28 MHz are communicated to a high speed RF switch 104 and through the switch to a 950 MHz lowpass filter 106 which deletes harmonics of the propagating radar signal prior to communication to the antenna 20.

High speed switch 104 includes a pair of coupling capacitors 108, 110. Between the coupling capacitors there are positioned two PIN diodes 112, 114 coupled to provide conduction towards ground and a resistor 116 coupling the anodes of the PIN diodes to signal OTS. When signal OTS has a sufficiently high DC level to cause diodes 112, 114 to conduct, the upper and lower sideband radar signals are effectively shorted to ground. However, when outer transmitter switching signal OTS maintains the anodes of PIN diodes 112, 114 sufficiently close to ground to prevent conduction, there is no short circuit path to ground and the transmitter switch 104 is effectively closed to allow the high frequency radar signal to pass from RF amplifier 102 to the low pass filter 106. The use of the PIN diode switch 104 provides an extremely rapid turn on time for the relatively high power RF radar signal by providing a rise time of approximately 3 nanoseconds.

As the upper and lower side bands reach a passive transponder device, they are modulated with each other to produce the sum which is always 1830 MHz or double the 915 MHz carrier signal. Because of the addition of the upper and lower sidebands, the 4.28 MHz modulating signal is effectively cancelled and the 1830 MHz return signal is always phase locked to the original 915 MHz carrier signal irrespective of frequency and phase variations induced by the 42.8 MHz oscillator 92.

Any time a transponder is within the detection zone 70, an 1830 MHz return signal is received by antenna 22 and communicated to a +10 db RF preamplifier 120. The amplified transducer return signal is communicated to a harmonic modulator 122 which modulates the return signal with a signal at twice the frequency of the 909.65 MHz signal generated by VCO 94. This produces a coherent IF signal at 10.7 MHz plus the doppler frequency which is amplified by +45 db at first IF amplifier 124. The output of first IF amplifier 124 is communicated through an IF receiver switch 126 to a second IF amplifier 128 providing a gain of +90 db. Switch 126 may be implemented with an RF switch designated type S1 which is commercially available from Watkins & Johnson.

A crystal filter 130 limits the IF signal to 10.7 MHz ±6.5 kilohertz. This narrow band limited filtering enables the overall gain of receiver 62 to be unusually high without the background noise overpowering and masking the doppler signal. A +30 db third IF amplifier 132 receives the output of crystal filter 132 and communicates the amplified IF signal to a doppler demodulator 134. Doppler demodulator 134 actually contains two modulator circuits. The first modulates the IF signal with a coherent 10.7 MHz signal from a divide by 4 section of frequency divider 96 to produce an in phase doppler frequency signal ORI. Demodulator 134 also modulates the IF signal with a 10.7 MHz signal derived by phase shifting the signal from frequency divider 96 by 90°. The resultant output is quadrature signal ORQ which is the doppler frequency signal phase shifted by +90° relative to doppler frequency signal ORI. By comparing the two signals ORI and ORQ, the direction of motion of a transducer relative to the antennas 20, 22 can be determined by the phase relationship between the two signals while the velocity of motion is proportional to the frequency of the two signals.

Stated more rigorously, the transmitted radar signal contains the upper and lower sidebands fo +fm and fo−fm where f0 is the 915 MHz carrier signal and fm is the 4.28 MHz modulating signal. The return signal reflected by a transponder is fr=(fo+fm)+-(fo−fm)+fd=2fo+fd where fd is the Doppler frequency signal representing motion of the transponder.

Harmonic modulator 122 produces the IF signal fif =2fo+fd−2fdm, where fdm is the 909.65 MHz demodulating signal. Since this signal is phase locked to the 915 MHz carrier signal, fif=2(915)+fd 2(909.65)=10.7 +fd. Modulation of this signal with 10.7 ∠0° produced fd ∠0° while modulation with 10.7 ∠−90° produces fd ∠+90°.

Figure 4:
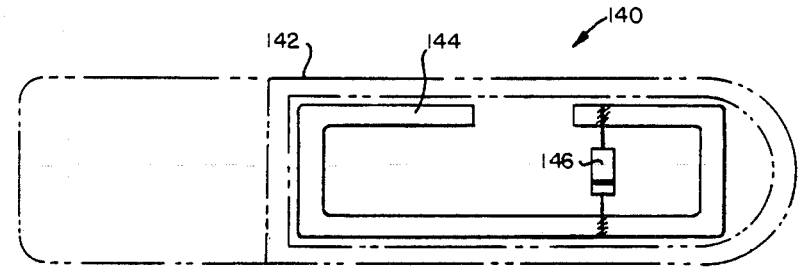
FIG. 4 is a sectional view of a transponder tag used in conjunction with the radar system shown in FIG. 1.

Referring now also to FIG. 4, there is shown a transponder tag 140 of the type that is attached to the merchandise being monitored. The structural details, use and manner of attachment and removal of such tags are disclosed in U.S. Pat. No. 3,973,418 and in co-pending application Ser. No. 501,881, filed June 7, 1983, and entitled "PNEUMATICALLY RELEASABLE, TAMPER-RESISTANT SECURITY TAG" by Leo Close. For purposes of describing the present invention, it is sufficient to note that the tag 140 includes a housing 142 enclosing and sealing a transponder or re-radiating antenna element 144 formed of brass shim stock in the shape of a generally rectangular, open loop, a portion of which is bridged by a nonlinear circuit element such as a diode 146.

Figure 5:
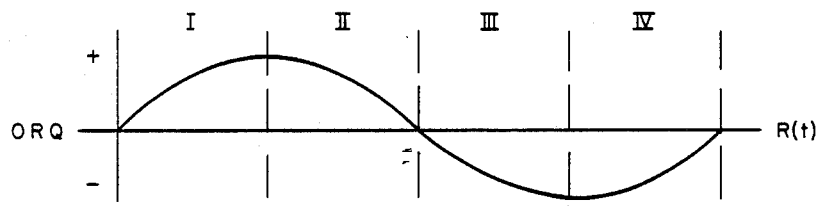
FIG. 5 is a graphical representation of a waveform that is useful in understanding the operation of the radar system shown in FIG. 1.
Figure 6:
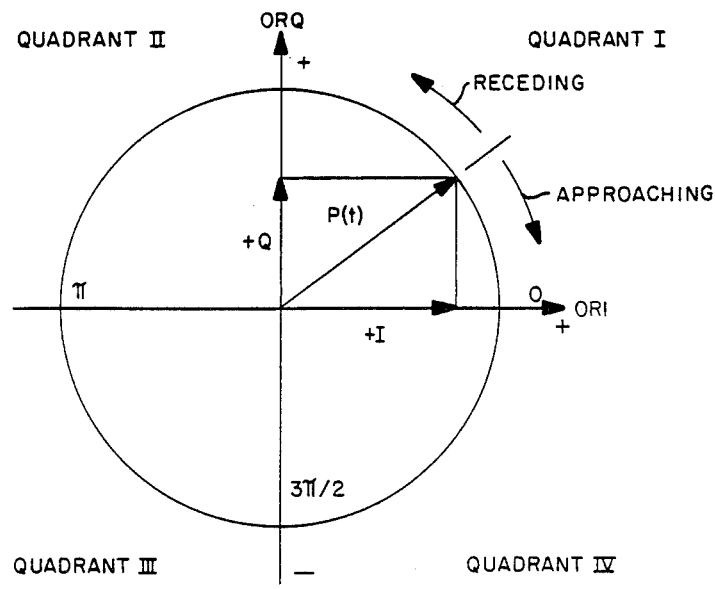
FIG. 6 is a graphical representation of a position vector that is useful in understanding the operation of the radar system showwnn in FIG. 1.

To facilitate detection of this relative phase (direction) information by the information processor 32, the quadrature signals ORI and ORQ can be conceptualized as defining a rotating position vector P(t) in a two dimensional coordinate space having signal ORI as the abscissa direction and signal ORQ as the ordinate direction as illustrated in FIGS. 5 and 6.

If the transponder tag 140 is receding from the exit or outer antennas 20, 22, R(t) =R1 +R2 is increasing and vector P(t) rotates in a counterclockwise direction. The signs of the signals ORI and ORQ vary in a repetitive sequence as P(t) rotates through the different quadrants as shown in Table I:

|     | QUADRANT | | | |
| --- | --- | --- | --- | --- |
|     | I | II | III | IV |
| ORI | + | − | − | + |
| ORQ | + | + | − | − |

TABLE I

By detecting the simple pattern of changes in the signs of ORI and ORQ, the direction of motion can be readily determined. For example, a change from ORI, ORQ=+, + to +,−would indicate motion in the approaching direction while a change from +, + to−, + would indicate motion in the receding direction.

Figure 7:
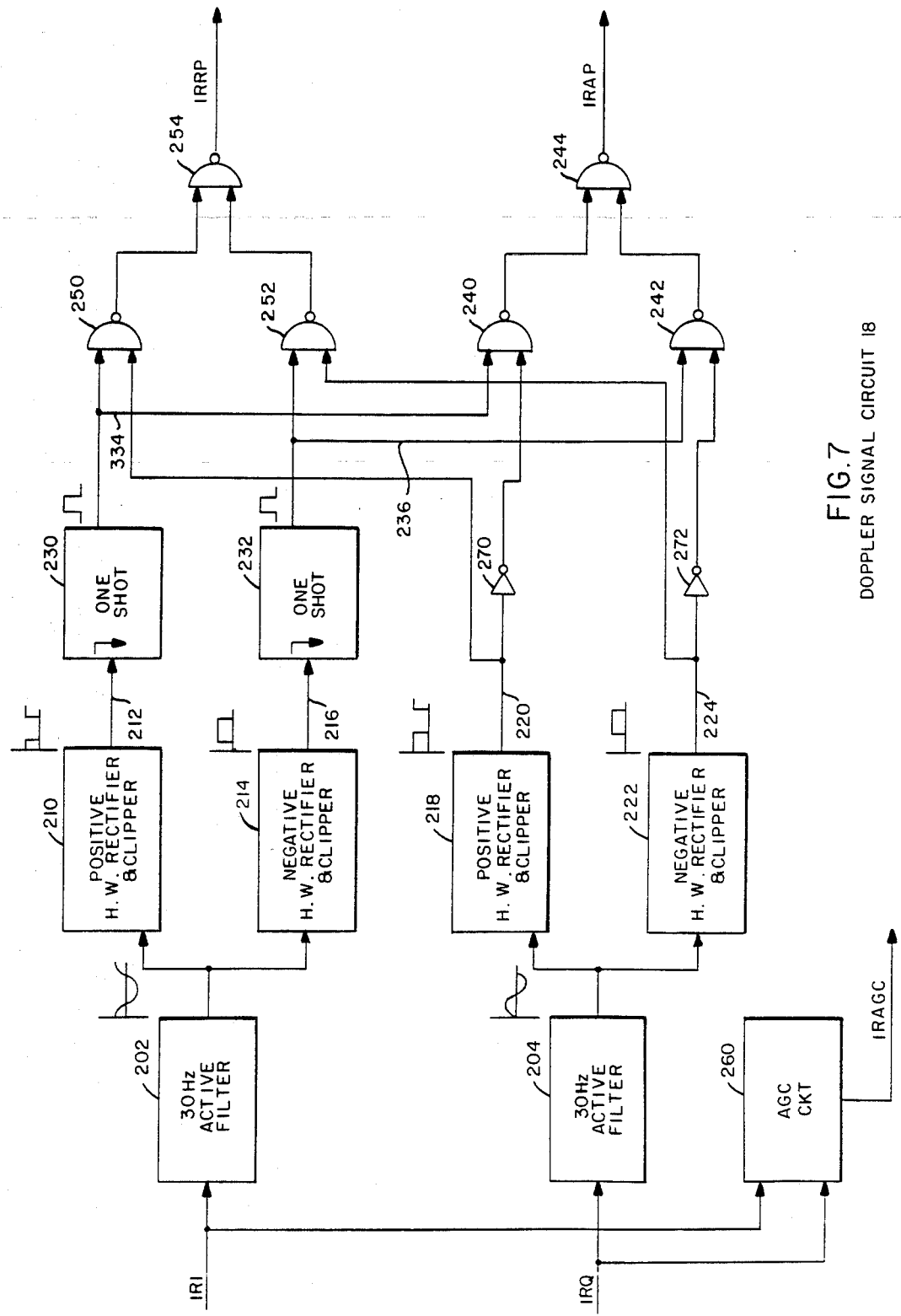
FIG. 7 is a block diagram and schematic representation of a doppler signal circuit used in the radar system shown in FIG. 1.

Referring now to FIGS. 7 and 8, there is shown the doppler signal circuit 18 which receives the inner receiver doppler frequency signals IRI and IRQ and generates the inner receiver receding pulse train IRRP in response thereto. Signal IRI is amplified and filtered by a 30 hertz active low pass filter 202. The output of filter 202 is a high quality sinewave at the doppler frequency. The radar units 12, 14 are operated in a pulse mode with a 10% duty cycle, e.g. 100 nanoseconds on and 900 nanoseconds off, to reduce power consumption and permit noninterfering alternating operation. Signals IRI and IRQ thus have intermittent, sampled values but active filter 202 and a corresponding IRQ active filter 204 restore the signals to produce smooth, continuous sinewaves at the outputs thereof. Output signals 206, 208, from filters 202, 204 respectively are illustrated in FIG. 8.

A positive half wave rectifier and clipper 210 receives the sinewave output from filter 202 and produces a positive rectangular wave pulse on signal 212 during the positive half cycles of signal 206. In order for pulse train IRRP to contain twice as many pulses for a given distance of motion of a transponder within the controlled area, a negative half wave rectifier and clipper 214 receives the output signal 206 from filter 202 and produces a positive rectangular pulse 216 during each negative half cycle of sinewave 206. This doubles the pulse rate of the detected doppler cycle pulse to about 1830 per foot of transducer motion for the frequencies used herein. In a corresponding manner a positive half wave rectifier and clipper 218 produces a rectangular wave signal 220 and a negative half wave rectifier and clipper 222 produces a rectangular wave signal 224. The signals 212, 216, 220 and 224 are illustrated in FIG. 8.

One shot circuits 230, 232 respond to signals 212, 216 respectively to generate a short positive pulse signal 234, 236 in response to each negative transition in the input signal. These pulse signals are illustrated in FIG. 8 superimposed upon the respective input signals 212, 216.

A NAND gate 240 receives the pulses 234 as one input and the rectified rectangular wave signals 220 complemented by an inverter 270 as a second input. As illustrated in FIG. 8, as long as a transponder is receding from inner antenna 26, signal 220 will be positive to enable NAND gate 250 and disable NAND gate 240 with the complement thereof at each occurrence of the pulses 234. The pulses 234 will be passed through to a NAND gate 244 or 254. If the transponder is approaching inner antennae 24, 26, then signal 220 will be oppositely phased to present logic zero at each occurrence of one shot pulse 234 and NAND gate 250 will be disabled so that no pulses are generated on signal IRRP. At the same time, NAND gate 240 will be enabled to generate signal IRRP through NAND gate 244.

Similarly, a NAND gate 252 passes one shot pulses 236 when enabled by signal 224 in response to a receding transponder. NAND gate 242 receives through inverter 272 the complement of signal 224 to pass pulse signal 236 in response to an approaching transponder. NAND gate 244 receives the outputs of gates 240 and 242 to generate the double frequency pulse train signal IRAP containing the one shot pulses 234, 236 when enabled by an approaching transponder and NAND gate 254 receives the outputs of gates 250 and 252 to generate the double frequency pulse train signal. IRRP containing the one shot pulses 234, 236.

An automatic gain control circuit 260 is conventional and operates in response to signals IRI and IRQ to generate the automatic gain control signal IRAGC to control the receiver gain of inner radar unit 14.

The outer receiver doppler signal circuit 16 may be substantially identical to the inner receiver doppler signal circuit shown in FIG. 7. The approaching pulse output signal is used instead of the receding pulse output signal. It will be apparent that signals IRRP, IRAP, ORRP and ORAP could all be communicated to information processor 32. This would permit the processor 32 to detect either direction of motion within or on either side of the controlled area.

Referring now to FIG. 9, the information processor 32 is shown as including a conventional STD bus 312 interconnecting a microprocessor CPU 314 such as an Intel 8085, an 8255 I/0 port 316 providing an interface to a set of 6 DIP switches 318, an 8253 programmable timer 320, a RAM store 322, a ROM program store 324, and an optional display 326. A-D and D-A conversion circuits 330 are shown connected to bus 312 as an alternative means of generating the automatic gain control signals IRAGC and ORAGC.

The outer receiver approaching signal, ORAP, is connected to interrupt 5.5 of CPU 314, the inner receiver receding signal is connected to interrupt 7.5 and a timing interrupt signal from timer output 2 of programmable timer 320 is connected to interrupt 6.5.

Three of the six switches 318 are used to select a binary coded value which determines a time out window for detecting an intrusion. For example, a setting of 5 would require 5, 20 millisecond timing intervals for a total window time of 100 msec. The other three switches select a binary coded number indicating the number of doppler pulse signals, ORAP, IRRAP which must be received within the time window before an alarm is sounded, for example 6. Requiring a selected plurality of pulses within a time period substantially reduces false alarms resulting from noise or other sources. False alarms are further reduced by requiring that the selected number of pulses be generated by both the receiver of inside radar unit 14 and the receiver of outside radar unit 12.

CPU 314 has interrupt 6.5 connected to output 2 of timer 320. Outputs 1 and 0 remain available for system functions not pertinent to the present invention. The alarm system 340 is coupled through I/0 port 316 to be selectively turned on and off by CPU 314. Alarm 340 responds to one of the data bus signals which is not coupled to any of the DIP switches 318.

Figure 10:
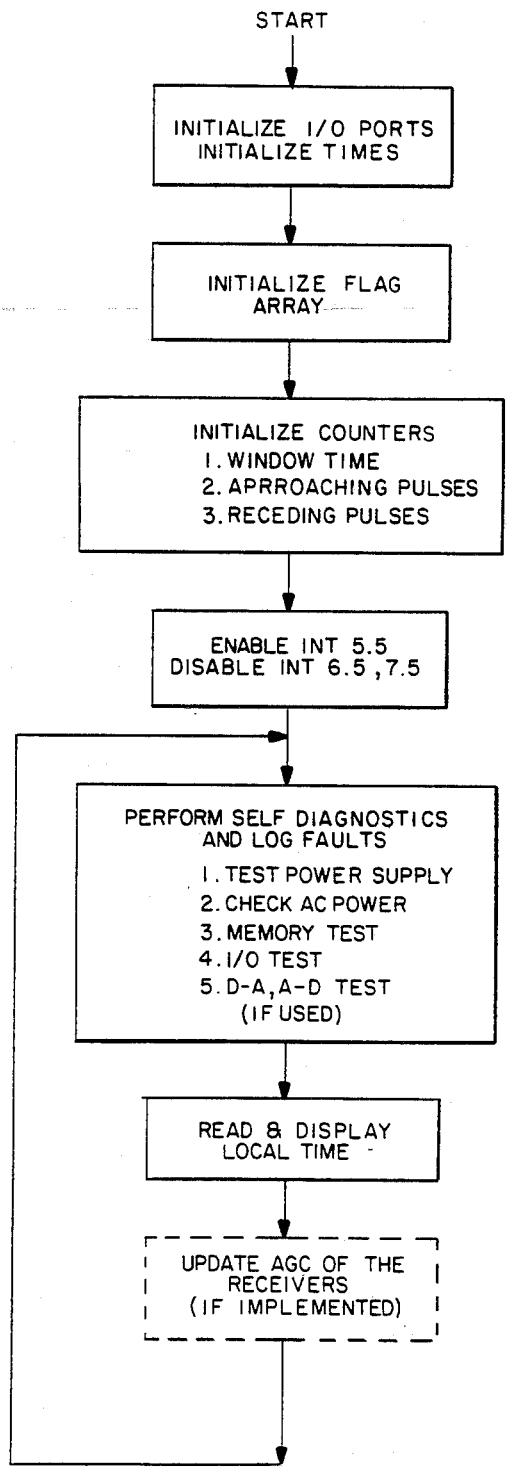
FIGS. 10, 11, 12 and 13 are flow charts illustrating the operation of the information processor shown in FIG. 9.

The main program for monitoring the controlled area is illustrated by FIG. 10. At turn-on the processor executes initialization routines. It initializes the I/0 ports and the processor flag array. It then initializes the various counters including the window time counter, the approaching pulse counter (PA) and the receding pulse counter (PR). The processor 314 then enables interrupt 5.5 and disables interrupts 6.5 and 7.5 before entering a repetitive loop.

In the loop CPU 314 performs self-diagnostic tests and logs any faults that are found. These tests typically include testing of the power supply and AC power level, memory tests and I/0 tests. The D-A and A-D converters 330 may be tested if present. After the tests are completed CPU 314 determines and displays the local time. Then, if the information processor 56 is controlling the receiver gain signals, these signals are updated. The loop is then repeated.

While the main program loop is being repetitively executed interrupt 5.5 is enabled to permit monitoring of the controlled area within the range of the outer receiver antenna 22. The transponder detection algorithm is designed to reduce or eliminate noise induced false alarms. When an approaching pulse is detected a time window is started and approaching and receding pulses are alternately counted. If the preset number of pulses are counted within the time window an alarm is set off, otherwise the pulse counters are reset and the CPU begins waiting for a first approaching pulse again.

Figure 11:
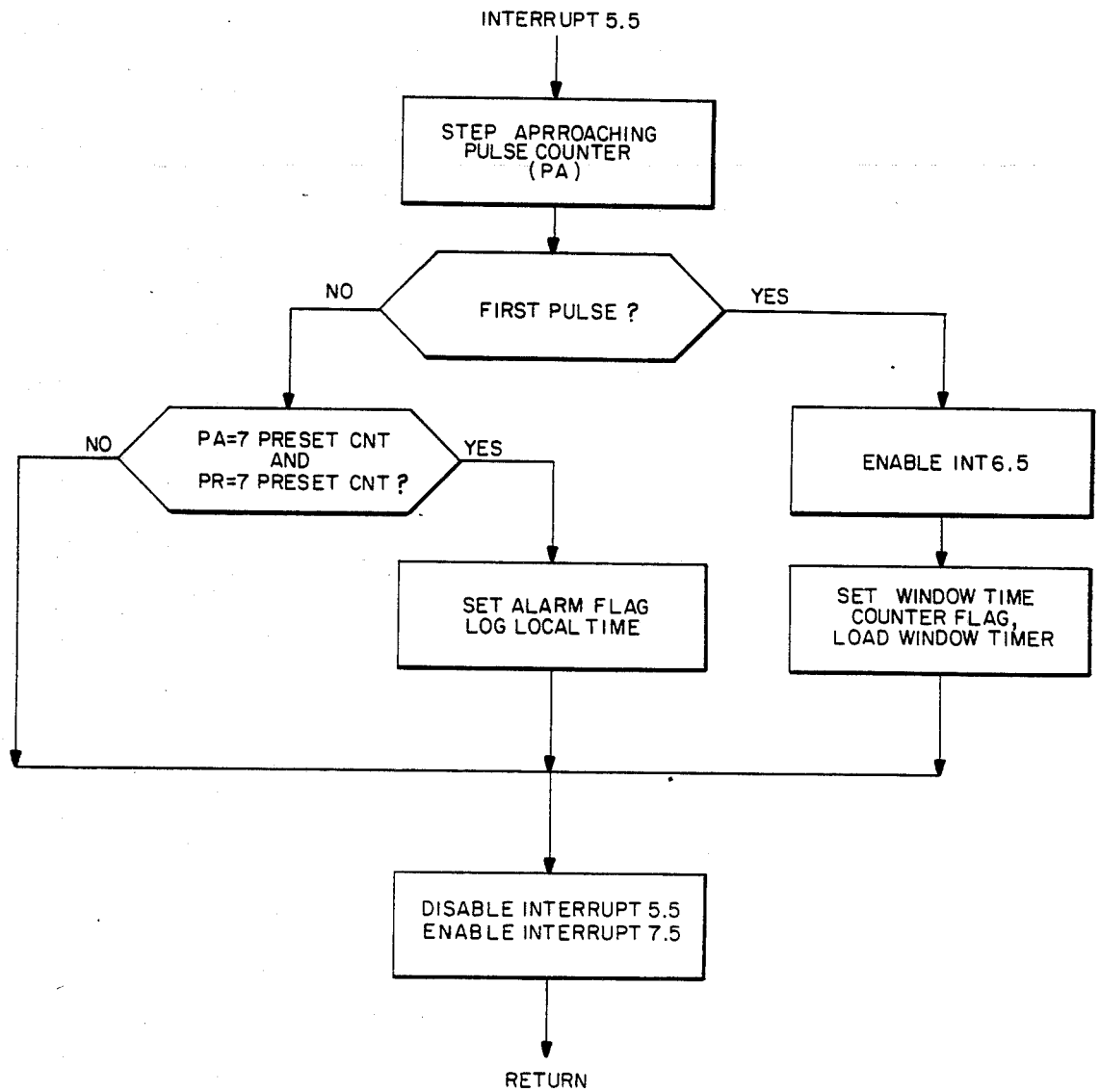

The routine for responding to approaching pulse interrupt routine 5.5 is illustrated in greater detail in FIG. 11. Upon entering the routine in response to receipt of an approaching pulse the approaching pulse counter (PA) is stepped. If this is the first counter pulse the window timer interrupt 6.5 is enabled, the window time counter flag is set and the window timer is loaded. Otherwise it is determined if both the approaching pulse counter (PA) and the receding pulse counter (PA) have reached the preset count. If yes, an alarm flag is set and the local time is logged to permit monitoring of alarm activities by management personnel.

Before interrupt 5.5 is exited, interrupt 5.5 is disabled and interrupt 7.5 is enabled. Thus, after each approaching pulse is detected, the information processor 32 begins waiting for a receding pulse. If the transducer is not actually in the controlled zone, the window will time out before a receding pulse is received and the system will return to the initial condition of waiting for a first approaching pulse.

Figure 12:
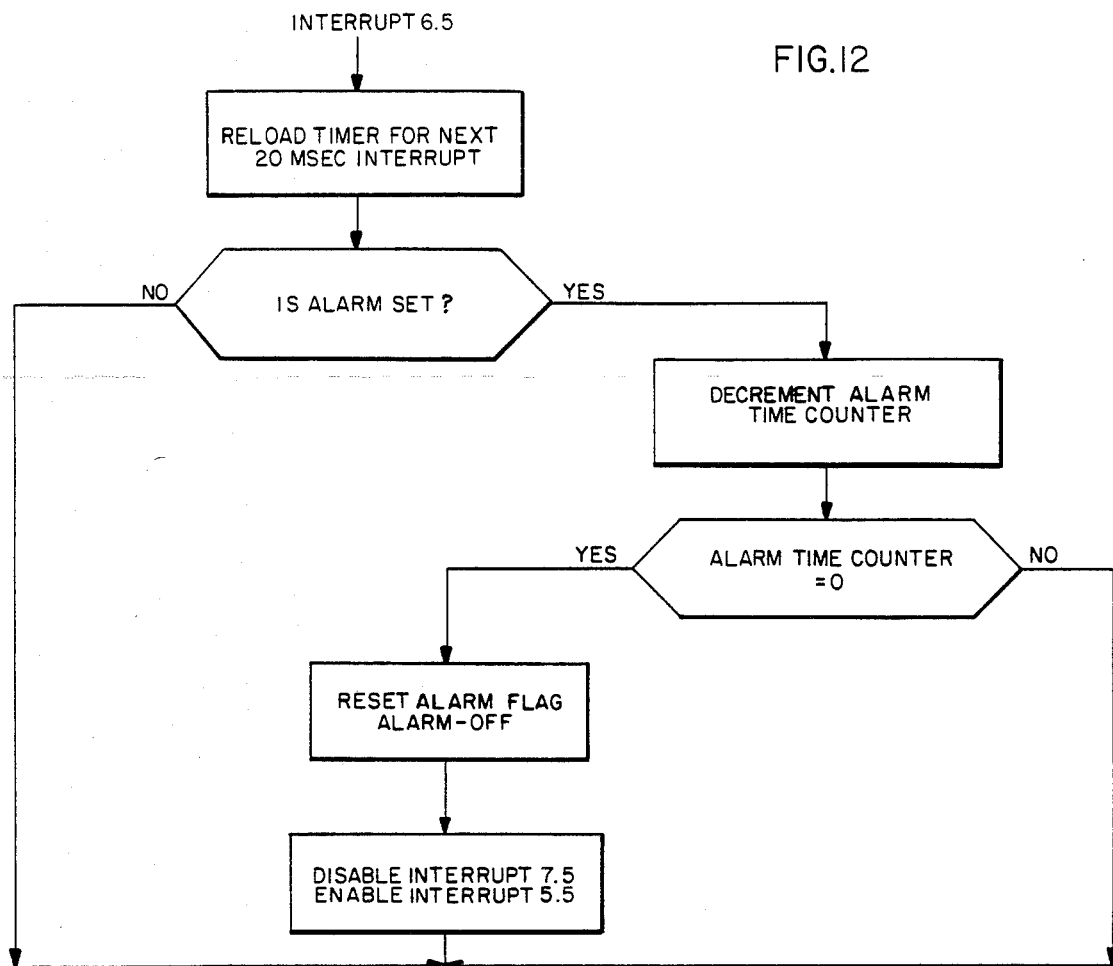

The timing interrupt routine 6.5 is illustrated in FIG. 12. Programmable timer 320 is programmed to issue an interrupt signal every 20 msec. When interrupt 6.5 is enabled CPU 314 responds by first reloading the timer for the next 20 msec interrupt.

If the alarm flag is set an alarm processing routine is executed. This routine first decrements the alarm time counter and then tests the counter for zero. If the alarm time counter has been decremented to zero, indicating that the alarm has been activated for the prescribed period of time, the alarm flag is reset and the alarm is turned off. Then the interrupt 7.5 is disabled and interrupt 5.5 is enabled before proceeding to test the window time counter flag.

If the window time counter flag is set, meaning that at least a first approaching pulse IRRP has been detected, the window time counter is decremented and then tested. If zero, a window time has occurred and the detection mechanism is reset by resetting the window time counter flag and resetting the pulse counters PA, PR. Then interrupt 7.5 is disabled and interrupt 5.5 is enabled to return CPU 314 to a state of waiting for a first approaching pulse on signal ORAP before the routine 6.5 is exited.

Figure 13:
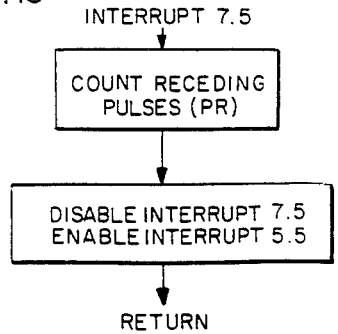

The routine for processing interrupt 7.5 is shown in FIG. 13. This routine simply increments the receding pulse counter (PR) and then returns CPU 314 to a state of waiting for a next approaching pulse IRRP while the window timer function continues to operate.

It will thus be appreciated that as a transducer enters the control zone between the inner antennas 24, 26 and the outer antennas 20, 22, and proceeds in a direction toward the outer antennas 20, 22 the motion produces doppler signals which result in pulses on signals IRAP and ORAP. When a selected number of these pulses have been counted on each signal, the alarm system 340 is turned on and the event is logged.

While there has been shown and described above particular arrangements of range limited coherent frequency doppler radar surveillance systems in accordance with the invention for the purpose of enabling a person of ordinary skill in the art to make and use the invention, it will be appreciated that the invention is not limited thereto. Accordingly, any modifications, variations or equivalent arrangements within the scope of the attached claims should be considered to be within the scope of the invention.

What is claimed is:

1. A range limited merchandise surveillance system for detecting a presence of a frequency modulating transponder within a surveillance zone comprising:
a transmitting system coupled to transmit a first signal at a first frequency, the transmitting system including a transmitter switch selectively enabling and disabling transmission of the first signal in response to a transmitter switching signal;
a receiving system coupled to receive and detect a second signal at a second frequency different from the first frequency, the receiving system including a receiver switch selectively enabling and disabling detection of the second signal in response to a receiver switching signal; and
a switching signal generator coupled to periodically generate the transmitter switching signal and the receiver switching signal with generation of the receiver switching signal being independent of actual operation of the transmitting system and with each period of the switching signals having a selected time interval between a disable-to-enable transition in the transmitter switching signal and an enable-to-disable transition in the receiver switching signal to selectively limit the effective range of the surveillance system.

2. The surveillance system according to claim 1 above wherein the switching signal generator includes a pulse generator periodically generating simultaneous enable state transmitter and receiver pulse signals and a delay circuit coupled to receive and selectively delay the transmitter switching pulse signal to produce a selected overlap time in the enable states of the delayed transmitter switching pulse signal and the receiver switching pulse signal, the delayed transmitter switching pulse signal being coupled to the transmitter as the transmitter switching signal and the receiver switching pulse signal being coupled to the receiver as the receiver switching signal.

3. The surveillance system according to claim 1 above, wherein the transmitting system and receiving system are frequency coherent systems generating a doppler effect signal that is indicative of motion of a transponder within the surveillance zone, the surveillance system further comprising a motion detector coupled to receive the doppler effect signal and indicate an alarm condition whenever the doppler effect signal indicates motion of a transponder over a selected minimum distance.

4. A range limited merchandise surveillance system for detecting a presence of a frequency modulating transponder within a selected surveillance zone comprising:
a first transmitting system coupled to transmit a first signal at a first frequency, the first transmitting system including a transmitter switch selectively enabling and disabling transmission of the first signal in response to a first transmitter switching signal;
a first receiving system coupled to receive and detect a second signal at a second frequency different from the first frequency, the first receiving system including a receiver switch selectively enabling and disabling detection of the second signal in response to a first receiver switching signal;
a second transmitting system coupled to transmit a third signal at a third frequency, the second transmitting system including a second transmitter switch selectively enabling and disabling transmission of the third signal in response to a second transmitter switching signal;
a second receiving system coupled to receive a fourth signal at a fourth frequency different from the third frequency, the second receiving system including a second receiver switch selectively enabling and disabling detection of the fourth signal in response to a second receiver switching signal; and
a switching signal generator coupled to periodically generate the first and second transmitter switching signals and the first and second receiver switching signals with each period of the respective first and second switching signals having respective first and second selected time intervals between disable-to-enable transitions in the transmitter switching signals and enable-to-disable transitions in the receiver switching signals to selectively limit the boundaries of respective first and second surveillance zones, the second transmitting and receiving systems being spatially displaced from the first transmitting and receiving systems to produce the second surveillance zone at a location which is different from but which at least partially overlaps the first surveillance zone to define the selected surveillance zone in the overlapping portions of the first and second surveillance zones.

5. The range limited surveillance system according to claim 4 above, wherein the third frequency is the same as the first frequency, the fourth frequency is the same as the second frequency and the switching signal generator generates the enable states of the second transmitter and receiver switching signals in alternate, noninterfering time relationship to the first transmitter and receiver switching signals.

6. The range limited surveillance system according to claim 5 above, wherein the first and second transmitting and receiving systems are frequency coherent systems generating doppler effect signals indicative of motion of a transducer within their respective first mentioned and second surveillance zones.

7. The range limited surveillance system according to claim 6 above, further comprising a doppler detection system coupled to receive the doppler effect signals from the first and second transmitting and receiving systems and indicating an alarm condition when and only when the doppler effect signals indicate motion of a transponder in a first direction relative to the first transmitting and receiving system and in a second direction different from the first direction relative to the second transmitting and receiving system.

8. The range limited surveillance system according to claim 7 above, wherein the first and second transmitting systems each have a fully disabled to fully enabled transition time less than or equal to 3 nanoseconds.

9. The range limited surveillance system according to claim 8 above, wherein the first and second receiving systems each have an enabled-to-disabled transition time less than or equal to one nanosecond.

10. The range limited surveillance system according to claim 9 above, wherein the second frequency is twice the first frequency.

11. The range limited surveillance system according to claim 10 above, wherein the second frequency is the sum of upper and lower sidebands produced by modulation of the first frequency.

12. A transponder merchandise surveillance system for detecting a transponder within a merchandise surveillance zone having precisely limited boundaries, the surveillance system comprising:
a first frequency coherent radar system disposed to detect a presence of a transponder within a first detection zone having precisely limited boundaries and generate a first receiver signal indicating a state of detection of a transponder within the first detection zone, the first radar system transmitting a first signal in response to an enable state of a first transmitter switching signal and receiving a second signal in response to an enable state of a first receiver switching signal;
a second frequency coherent radar system disposed to detect a presence of a transponder within a second detection zone having precisely limited boundaries and disposed in overlapping relationship with the first detection zone to define the surveillance zone as the overlapping portions of the first and second detection zones, the second radar system generating a second receiver signal indicating a state of detection of a transponder within the first detection zone, the second radar system transmitting a third signal in response to an enable state of a second transmitter switching signal and receiving a fourth signal in response to an enable state of a second receiver switching signal;
a switching signal generator coupled to periodically generate the first and second transmitter and receiver switching signals with the enable states of the first switching signals having a time displaced noninterferring relationship to the enable states of the second switching signals, there being a selected first time interval between each disable-to-enable transition in the first transmitter switching signal and each subsequent enable-to-disable transition in the first receiver switching signal which controls the boundaries of the first detection zone and there being a selected second time interval between each disable-to-enable transition in the second transmitter switching signal and each subsequent enable-to-disable transition in the second receiver switching signal which controls the boundaries of the second detection zone; and
a detection system coupled to receive the first and second receiver signals and in response thereto to generate an alarm indication whenever a transponder is indicated as present within both the first and second detection zones.

13. The surveillance system according to claim 12 above, wherein the detection system is a doppler detection system and generates an alarm indication only when a transponder is detected by the first radar system as moving in the first detection zone through a selected distance in a selected first direction relative to the first radar system and is detected by the second radar system as moving in the second detection zone through a selected distance in a selected second direction different from the first direction relative to the second radar system.

14. A merchandise surveillance system comprising:
a coherent frequency doppler radar system disposed to generate a doppler signal indicative of motion of a transducer within a detection zone limited in extent by a maximum transmitter-to-transducer-to-receiver radar signal propagation time; and
a processing system coupled to receive the doppler signal and indicate the presence of a transducer within the detection zone in response to an indication by the doppler signal of motion of the transducer within the detection zone in a given direction and through a selected minimum distance.

15. A retail store entryway surveillance system comprising:
a range limited, coherent doppler frequency radar system disposed to monitor any motion of a transducer in the entryway by periodically radiating the entryway with a radio frequency incident signal during a transmit time interval that is shorter than the period and periodically monitoring the entryway for receipt of a return signal generated by a transducer in response to an incident signal, the entryway being monitored during a receive time interval which is shorter than the period, which begins prior to the transmit time interval and which terminates a predetermined time after initiation of each transmit time interval.

16. The surveillance system according to claim 15 above, wherein the radar system includes means for generating a receiver signal containing a doppler frequency representing motion of the transducer and further comprising a doppler signal circuit coupled to generate doppler frequency signals representative of a presence of the transponder within the entryway in response to the receiver signal, a transmitter generating the radio frequency incident signal and a fast rise time diode transmitter switch selectively gating the radio frequency incident signal.

* * * * *